United States Patent [19]
Lynch

[11] 3,995,413
[45] Dec. 7, 1976

[54] ATTACHMENTS FOR ROW TYPE BROADCAST COMBINES

[76] Inventor: Roy Durward Lynch, Olton Route, Plainview, Tex. 79072

[22] Filed: Dec. 18, 1975

[21] Appl. No.: 641,893

[52] U.S. Cl. .................................. 56/119; 56/96
[51] Int. Cl.² ..................................... A01D 45/02
[58] Field of Search ............... 56/119, 94, 96, 105, 56/100, 126–130

[56] References Cited
UNITED STATES PATENTS

| | | | |
|---|---|---|---|
| 2,765,612 | 10/1956 | Raumaker et al. | 56/97 |
| 2,836,026 | 5/1958 | Gray et al. | 56/119 |
| 2,862,345 | 12/1958 | Wigham | 56/119 X |
| 2,867,961 | 1/1959 | Heilbrun | 56/119 |
| 2,948,100 | 8/1960 | McEachern | 56/119 |
| 3,018,601 | 1/1962 | Griffin et al. | 56/119 |
| 3,210,920 | 10/1965 | McEachern | 56/119 |
| 3,600,878 | 8/1971 | Lynch | 56/119 |

Primary Examiner—Russell R. Kinsey
Attorney, Agent, or Firm—Wayland D. Keith

[57] ABSTRACT

Attachments for broadcast combines which have been converted into row type combines, in which the bearing guard attachment shields the shaft bearing on the lower ends of the drum shafts from becoming covered with vegetation which wraps therearound during the harvesting operation. The vegetation wrapped around the shaft bearing and the lower ends of the shafts precludes free circulation of air which cools the bearings and prevents the loss of lubricant therefrom due to expansion of the lubricant resulting in leakage from the elastomer seals. Rearwardly inclined pans positioned on the combine so as to be between the crop rows, each having angularly diverging upstanding walled sides for a portion of the length of the forward ends, which walled sides connect with upstanding walled sides along each lateral side of each pan to define a passageway for the crop being harvested to pass through, with the pans, having open rear ends to catch the shattered seed or grain and to direct same downwardly onto the conveyor and into the thresher of the combine.

7 Claims, 9 Drawing Figures

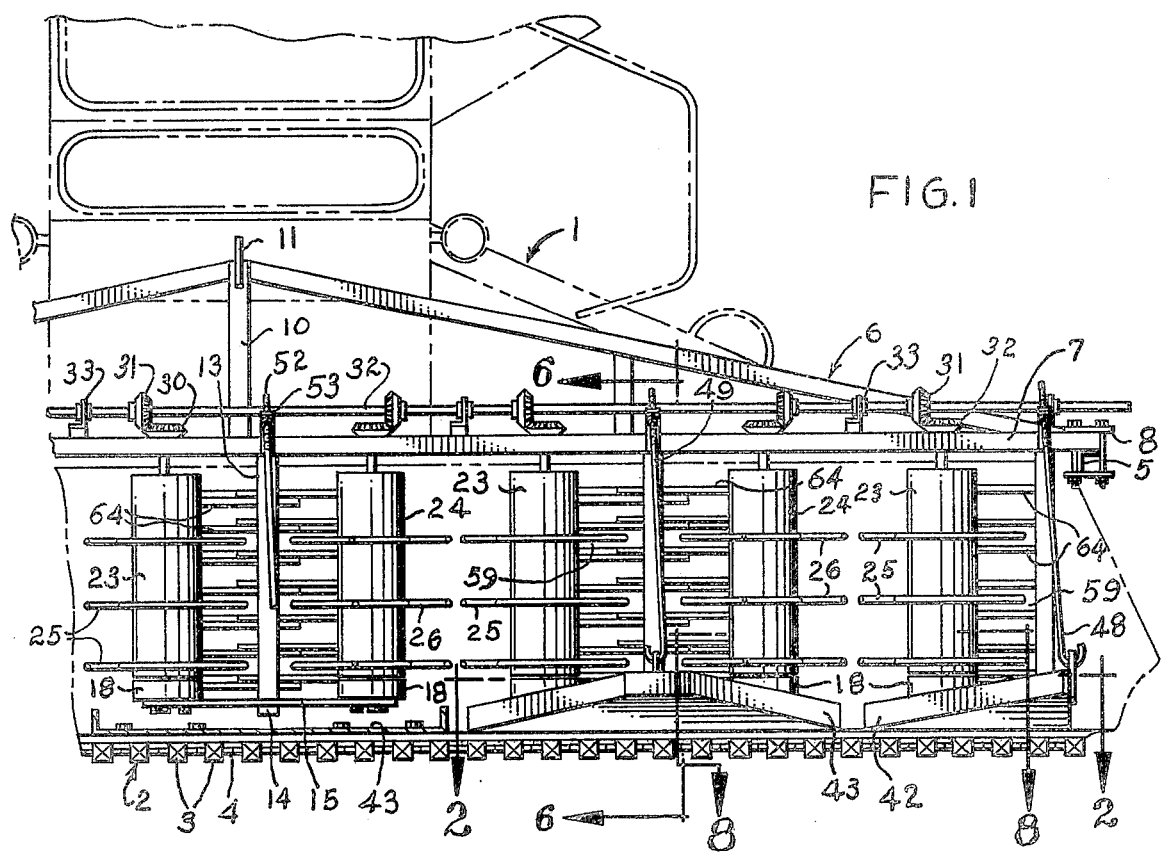
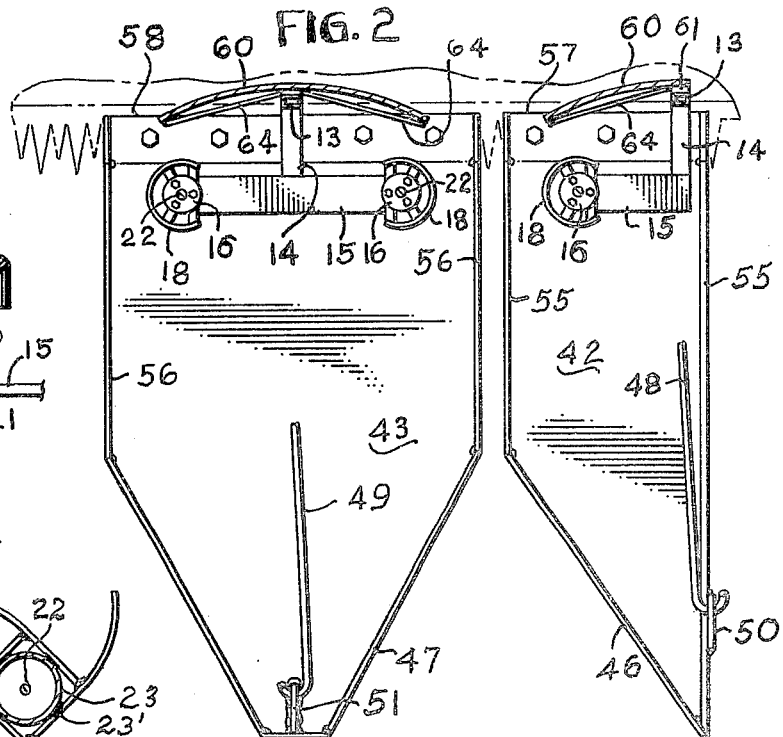
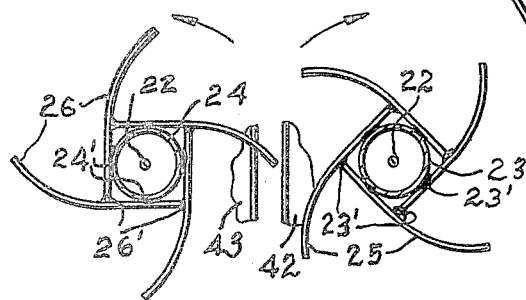

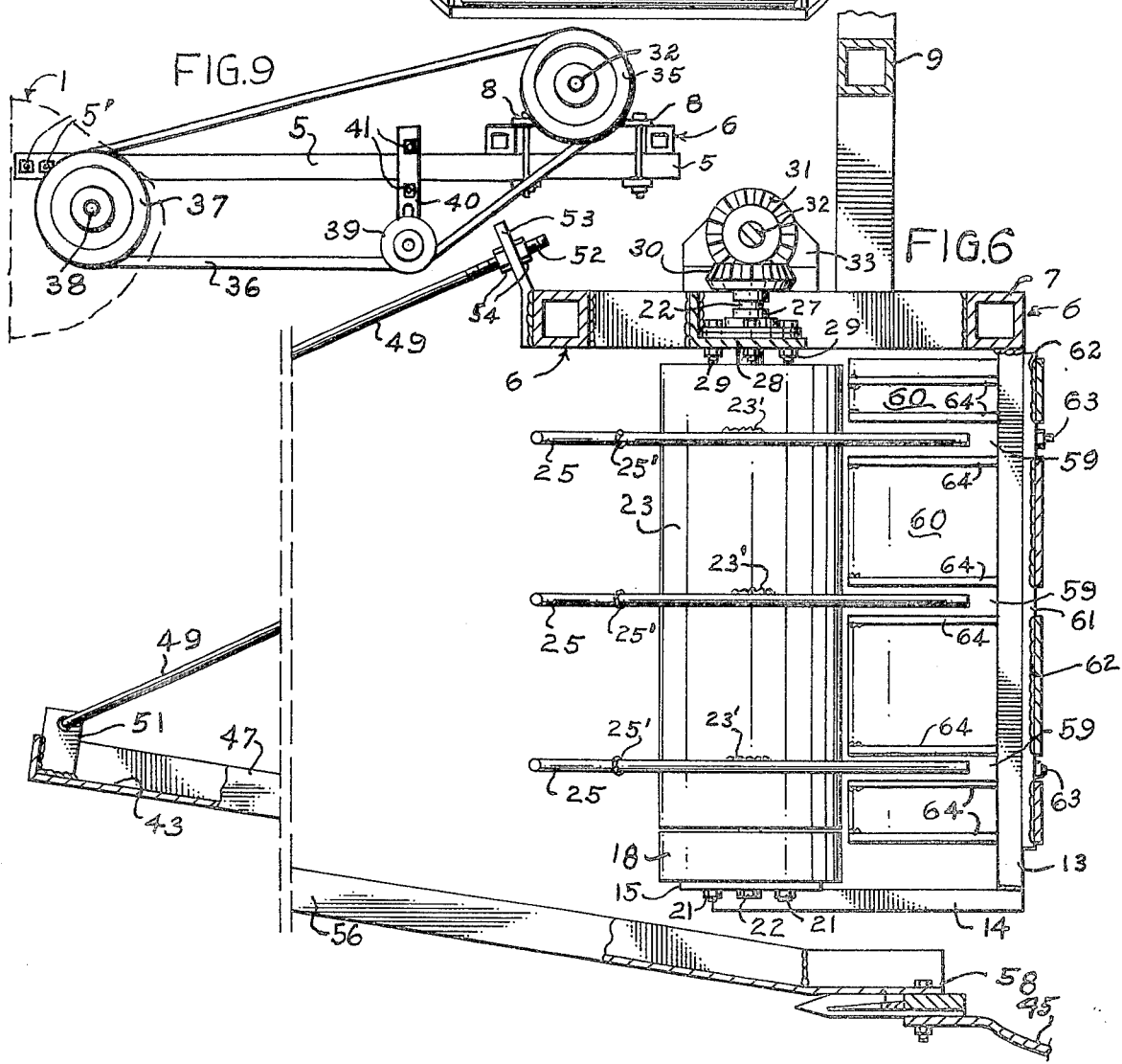

ATTACHMENTS FOR ROW TYPE BROADCAST COMBINES

BACKGROUND OF THE INVENTION

Various attachments for broadcast harvesters and combines have been proposed heretofore, but these for the most part, have certain deficiencies which the Applicant proposes to correct or improve upon.

Attachments of this general character, for broadcast combines, are disclosed in the several patents to Irvin D. McEachern, U.S. Pat. Nos. 2 929 185, 2 948 100, 3 210 920, 3 392 514 and 3 425 201 and the U.S. Pat. to Roy Durward Lynch, No. 3 600 878. In the manufacture of these attachments and applying them to combines to convert a broadcast type combine into a row type combine, as disclosed in the U.S. Pat. No. 3 600 878 to Roy Durward Lynch and by the patents, as listed above to his predecessor, Irvin D. McEachern, the need for certain improvements became apparent, that is, the necessity for protecting the bearings at the lower end of the shaft, on which the rotary cylinder is mounted, against overheating and the lubricant being expelled therefrom due to the expansion of the lubricant within the sealed ball bearing housings on the lower end of the shaft, which mounts the rotary cylinders of the combine.

It was also found that in the harvesting of certain row crops, such as sunflowers, legumes, such as soy beans, maize Kaffir corn, cane and other grain sorghums, that weeds, stalks, and the like from the crop being harvested, became wrapped around the shaft, at the exposed portion thereof adjacent the bearing housings or the seed gathering pan, which would cause the bearings to become overheated, the lubricant to expand and be expelled, thereby resulting in the untimely wear on the ball bearings on which the shaft is mounted. The upstanding sides of the seed gathering pan also reduces the amount of vegetation to reach the rotating shafts.

SUMMARY OF THE INVENTION

This invention relates to an attachment for broadcast combines to convert the broadcast combine into an implement for the harvesting of row crops, with greater capacity and greater efficiency.

The present attachment is particularly adaptable for attachment to a combine using the attachments as disclosed in the aforementioned patents, in order to increase the efficiency of the harvesting by enabling four to six rows to be harvested by one pass of the combine over the field.

The present attachment enables the high speed ball bearings on the lower ends of the shafts of the rotating cylinders to be protected from grass, weeds, stalks and other vevetation, which would otherwise become lodged or wrapped around the shaft at the space between the bottom of the cylinder and the sickle, which excludes air from the bearings and prevents adequate cooling thereof. Since ball bearings and other anti-friction bearings on the shafts of farm machinery are prelubricated and sealed with a synthetic rubber sealing material, such as Neoprene, the bearing is lubricated for a long period of time, and foreign matter is excluded from the sealed chamber in which the bearings are located.

The present arrangement provides for a guard which will prevent weeds, grass, stalks and the like from becoming wrapped around the shaft at the space intermediate the lower end of the rotating cylinder and the upper face of the bearing support, thereby protecting the bearings and enabling them to be air cooled at all times. If the bearings are properly cooled, the lubricant within the chamber will not become overheated, expanded and expelled from the chamber, thus the life of the bearings is prolonged.

A further attachment provides forwardly extending pans having upstanding walls around the front and sides thereof, with the forward end of the pan being raised above the normal level, so when a ripened crop is being harvested, grain which is shattered by the harvesting process, will fall into the forwardly extending pans which pans are so inclined that the vibration of the machine will cause the seeds to be vibrated down the inclined pan and be directed into the conveyor compartment of the harvester to be passed through the threshing mechanism of the combine. The pans, which are inclined rearwardly, are particularly valuable in the harvesting of sunflowers and lagumes, such as soy beans, thereby gleaning a goodly portion of the seed which would otherwise have been shattered onto the ground and lost. The forward ends of the pans are adjustable so as to direct the seed inwardly to the combine conveyor.

OBJECTS OF THE INVENTION

An object of this invention is to provide an attachment for the rotating cylinder of a broadcast harvester which will shield that portion of the shaft between the lower end of the cylinder and the bearing, which portion of the shaft is exposed, to prevent weeds, grass, stalks and the like from becoming wrapped around the shaft, thereby causing overheating and inefficient operation or failure of the ball bearings.

Another object of the invention is to provide a bearing mounting within a partially cylindrical skirt, which shields the bearing on the lower end of the shaft from weeds, stalks and the like.

Still another object of the invention is to provide a pan which has upstanding sides, which pan is mounted on the combine intermediate the rows of the crop being harvested, which pan will further shield the shaft from becoming entangled with weeds and stalks on that exposed portion of the shaft below the rotating cylinder of the combine and the bearing.

Yet another object of the invention is to provide pans intermediate the crop rows being harvested, which pans are so shaped as to direct stalks into cutting relation with the sickle and at the same time prevent stalks, weeds and vines from reaching the shaft of the rotating cylinders and becoming wrapped therearound in such manner as to minimize air circulation and cause overheating of the bearings.

A further object of this invention is to provide, on a broadcast type combine having a sickle, a transverse row harvester attachment frame secured thereon, braces depending downwardly from the row harvester attachment frame, which braces form upright supports, a laterally extending support member on the lower end of the upright support braces, an apertured, transverse bearing support member secured to the laterally extending support member to receive at least one bearing thereon.

Still a further object of the invention is to provide a broadcast combine which has pans with upstanding sides, which pans are angulated downwardly and rearwardly, which angulation and the normal vibration of the combine causes the seed, which is shattered from the crop, to be directed rearwardly onto the conveyor of the combine.

Yet another object of the invention is to provide pans, with upstanding sides, for attachment to the combine, above the sickle bar thereof, which pans each have a laterally angulated forward portion to direct stalks inwardly, and since the pans are angulated from the forward end downwardly through the greater portion of the length thereof, the seeds that fall thereinto are moved rearwardly by vibration, into the conveyor of the combine.

A final object of the invention is to provide a bearing mounting with a partially cylindrical skirt of the same arcuate shape and size as the cylindrical drums and being in relatively close fitting relation to the lower end of the drums with the greater portion of the bottom of the skirt being open between the inner diameter thereof and the bearing to permit dust and small trash to fall therethrough.

BRIEF DESCRIPTION OF THE DRAWINGS

IN THE DRAWINGS:

FIG. 1 is a fragmentary front elevational view of a broadcast combine, with parts of the combine being shown in dot-dash outline, with parts being broken away and with parts shown in section, the cylinder attachment being shown in full outline.

FIG. 2 is a sectional view taken on the line 2—2 of FIG. 1, looking in the direction indicated by the arrows;

FIG. 3 is a lower fragmentary view of a portion of a rotatable cylinder mounted on a shaft, which shaft is mounted on a bearing, and showing the bearing support therefor;

FIG. 4 is a perspective view taken from the top, a side and an end of one of the pans for catching seeds, which pan is mounted on the sickle of the combine, for directing seed onto the conveyor thereof;

FIG. 5 is a view similar to FIG. 4, but of a half pan, so as to be complementary with the pan as shown in FIG. 4, when mounted on the combine, as shown in FIG. 1;

FIG. 6 is a sectional view taken on the line 6—6 of FIG. 1, looking in the direction indicated by the arrows, with parts broken away and with parts being shown in section to bring out the details of construction of the shield and pan;

FIG. 7 is a perspective view of the weed and stalk guard mounted on the bearing support and which partially surrounds the bearing on the lower end of the shaft of the rotating cylinder element;

FIG. 8 is a diagrammatic view showing the drums with fingers thereon, rotating in the direction indicated by the arrows, to move the crop being harvested inwardly between the spaced apart, forwardly extending pans;

FIG. 9 is an end elevational view of the drive mechanism as attached to a fragmentary portion of a combine, which drive mechanism has a transverse drive shaft which drives the drums of the harvester attachment, which drums have outwardly extending curved fingers thereon.

DETAILED DESCRIPTION OF THE INVENTION

With more detailed reference to the drawing, in which like reference characters designate like parts in the several views thereof, in which the numeral 1 designates generally a broadcast type combine, which is shown in dot-dash outline, except for the sickle unit 2, which is shown in full outline. The sickle unit 2 comprises outwardly extending fingers 3 and a reciprocating blade 4, as is well known in the art of combines.

The combine 1 has forwardly extending mounting bars 5 secured thereto by bolts 5'. The mounting bars 5 form a part of the row harvester attachment designated generally by the numeral 6. The row harvester attachment 6 has an elongated frame 7 extending the width of the combine, with clamps 8 attaching the frame 7 to the forwardly extending bars 5. The frame 7 has a truss member 9 extending from end to end thereof, which truss member 9 is secured to the frame 7 by upright brace 10. An upstanding member 11 is secured centrally of the truss member 9 to enable a hook or the like to be engaged therewith to lift the row harvester attachment 6 from the combine 1.

Downwardly extending braces 13 are secured to the rear of the frame 7, and each brace 13 has a forwardly extending support member 14 to which an apertured transverse member 15 is secured, as by welding, to support a bearing 16 on each end thereof and a bearing guard collar 18. Each bearing guard collar 18 has spaced apart, apertured bars 19 and 20 secured thereto and each bearing 16 is secured thereto and to the apertured transverse member 15, by bolts 21. Each bearing 16 mounts the lower end of a shaft 22, on which shafts the respective drums 23 and 24 are mounted for rotation.

The drums 23 and 24 are identical except, the fingers 25 of the drum 23 curve in one direction and the fingers 26 on the drum 24 curve in the opposite direction, so as the drum 23 with fingers 25 thereon is rotated in a clockwise direction, the drum 24 with fingers 26 thereon is rotated in a counterclockwise direction to urge the crop being harvested against the sickle unit 2, as will best be seen in FIGS. 1, 2, 6 and 8.

Each bearing guard collar 18 surrounds the portion of the bearing adjacent the crop row and is open at the bottom and the inner side thereof, so air may circulate freely therethrough to cool the bearings 16, and at the same time the vegetation being cut is prevented from wrapping around the shaft adjacent the bearing 16, which would prevent free circulation of air to the bearings. Unless cooled by the circulation of air therearound, the bearings would become overheated, and since the bearings 16 are of the sealed lubricant type, when overheated the lubricant expands and escapes from the bearings, which bearings consequently wear out completely in a very short time.

The row harvester comprises pairs of drums, 23 and 24 for each crop row, each drum having a shaft 22 therein, which shafts are mounted in spaced apart relation, so a drum will be on each side of the plant passagway for the crop row. The row harvester usually comprises two to six such row units, but for the purpose of describing the same in the simplest manner, reference will be had to a pair of drums each on an individual shaft.

Each drum 23 and 24 is spaced slightly upward from the respective bearing guard collar 18, at the lower ends thereof, and the upper end of each shaft 22 is journaled in a bearing 27. The bearings 27 are secured to the transverse bearing support 28 by bolts 29, so as to hold the bevel gear 30 in mesh with bevel gear 31, which is mounted on transverse shaft 32, which shaft 32 is jounaled in spaced apart bearings 33 of the bearing support members 34 which are secured to the frame 7, as will best be seen in FIGS. 1 and 6. The shaft 32 has a driven member 35, such as a pulley or sprocket. The driven member 35 has an endless drive member 36, which may be a belt or a chain, which surrounds drive member 37 mounted on shaft 38, which shaft is driven by the combine power unit in a manner well understood in the art of drives. An idler member 39, which may be an adjustable pulley or sprocket is mounted on a bar 40, which bar 40 is so constructed as to allow for the adjustment of the tightness of the endless drive member 36, by movement of the pulley or sprocket 39 thereon. The bar 40 is secured to the outwardly extending mounting bar 5.

The fingers 25 and 26 are welded onto the respective drums 23 and 24, as indicated at 23' and 24', and each of the fingers of the respective drums is welded, as indicated at 25' and 26' to an adjacent finger intermediate the length thereof so as to brace and strengthen the fingers.

With the drums 23 and 24 being rotated in the direction, as indicated by the arrows in FIG. 8, by the rotation of the shaft being driven through the drive mechanism as shown in FIG. 9, the shaft 38 will be driven, so as to drive bevel gears 30 and 31 to rotate the drums 23 and 24, as will best be seen in FIG. 8, and with the reciprocating sickle blade 4 cutting the stalks of the crop being harvested, such as soy beans or other legumes, sunflower seed, maize, kaffir, sorghum or the like, the shattered seed will fall into the pans 42 and 43, which seeds would otherwise fall to the ground, and the stalks of the crop being harvested will pass down passageway 44 to be moved by the fingers 25 and 26 of the respective drums 23 and 24, into cutting relation with the sickle unit 2 and thence onto the apron 45 of the combine 1, thence onto the conveyor of the combine, in a well known manner, so that the seed will be threshed and directed into the storage compartment of the combine, in a manner well known in the art of harvesting.

The pans 42 and 43 have angulated ends 46 and 47, respectively, to direct the crop being harvested in through passageway 44, and, due to the elevation of the ends 46 and 47 by rods 48 and 49 which engage apertured lugs 50 and 51 at the lower ends, and which rods are preferably screw threaded at the upper ends thereof, as indicated at 52, and pass through upstanding apertured lugs 53, so that the nuts 54 may adjust the angularity of the pans 42 and 43 with respect to the horizon. This will cause the seed, which is caught in the pens, to be moved rearwardly by vibration of the combine as it moves over the terrain, thereby saving the seed or grain that would otherwise fall to the ground and be wasted.

The pans 42 and 43 each have an upstanding wall 55 and 56, respectively, around the forward ends and sides thereof, but with the rear ends of the pans 42 and 43 open, as indicated at 57 and 58, so that the seed or grain will be directed onto the apron 45, and thence onto the conveyor (not shown) of the combine 1.

The fingers are preferably spaced in timed relation, as indicated in FIG. 8, and pass through slots 59 between shedder shields 60. The shedder shields 60 are secured to the upright bars 61, as by welding, as indicated at 62, and bolts 63 secure the upright members, onto which the shedder shields are bolted, to the upright member 13, as will best be seen in FIGS. 2 and 6, so as to direct stalks and/or vines onto the apron 45 of the combine 1. In this manner both the seed and/or grain on the stalks or vines and the shattered seed or grain, gathered in the pans, will be saved.

The shedder shields 60 are arcuate and have brace bars 64 welded to the respective shedder shields 60 and to the upright bars 61 to form a chord brace for the shedder shields. The shedder shields are so spaced vertically as to have slots 59 therebetween so, as the fingers 25 and 26 pass through these slots, the shedder shields 60 remove the stalks from the fingers and direct these into the conveyor of the combine. The sheddar shields 60, the upright bar 61 and chord braces 64 may be removed from the downwardly extending braces 13, as a unit, by removing bolts 63 from the downwardly extending braces 13 which form support members.

What is claimed is:

1. An attachment for a broadcast type combine having a sickle, which combine has a row harvester attachment thereon, which row harvester attachment includes an elongated transverse frame, braces forming support members extending downwardly from the elongated transverse frame at spaced intervals therealong so as to be between the rows of the crop being harvested, a further support member secured to the lower end of each downwardly depending brace support member and extending laterally therefrom, an apertured transverse member mounted near the outer end of each said further support member and extending therefrom, the transverse member being apertured near the outer ends thereof, spaced apart bearings mounted on the elongated row harvester frame and mounting the upper ends of the spaced apart upright shafts, bearings mounted on the apertured transverse member and mounting the lower ends of the upright, spaced apart shafts, a rotatable drum mounted on and secured to each upright shaft, each drum having fingers mounted thereon in circumferentially and longitudinally spaced apart, timed relation, and extending outwardly therefrom to urge the crop being harvested against the sickle of the combine, which attachment comprises;
   a. a partly cylindrical collar mounted on each said lower bearing and extending upwardly substantially from the apertured transverse member into closely spaced relation with the lower end of each drum,
      1. the closed side of each guard collar being adjacent the row of the crop being harvested so as to permit free circulation of air through the bottom and the open side portion of each partly cylindrical bearing guard collar.

2. An attachment for a combine as defined in claim 1; wherein
   a. each bearing guard collar has spaced apart, apertured lugs secured thereto, which lugs extend inwardly with respect to the axis of the bearing,
      1. bolts extend through the apertures in said bearings, said apertured lugs on said bearing guard collar and through the apertures in said apertured transverse member to secure the lower end of the shaft of the drum in aligned relation with the bearing on the upper end of the shaft.

3. An attachment for a combine as defined in claim 2; wherein
   a. at least one of said apertured lugs, secured to said bearing guard collar extends in abridging relation between the ends of said bearing guard collar on the lower side thereof.

4. An attachment for a combine as defined in claim 3; wherein
   a. said other apertured lugs on said bearing guard collar are circumferentially spaced and extend inwardly toward the axis of the shaft so as to support a side of a bearing thereupon.

5. An attachment for a broadcast combine as defined in claim 1; wherein
   a. at least a pair of pans mounted on and secured to the sickle unit of the combine,
      1. each said pan having an upright wall around the transverse sides and the forward end portion,
      2. each said pan having an open rear end from which seed is directed onto the apron of the combine,
      3. the forward end of each pan, adjacent the crop row, being angulated toward the row to direct the crop being harvested inwardly,
      4. the pans of each pair defining a passagway therebetween, which passageway is in close proximity to a row of the crop being harvested, so the spaced apart, rotatable drums will direct the crop being harvested into the passageway onto the conveyor with the shattered seed falling from the crop being directed into the pans and onto the conveyor of the combine,
      5. the forward end portion of each pan being elevated,
      6. an adjustable member connected between the forward end of each pan and the elongated frame of the harvester attachment to support said pans.

6. An attachment for a broadcast type combine having a sickle, which combine has a row harvester attachment thereon, which row harvester attachment includes an elongated transverse frame, spaced apart bearings mounted on the elongated row harvester frame to receive the upper ends of the spaced apart, upright shafts, bearings mounted on the row harvester attachment to receive the lower ends of the upright, spaced apart shafts, a rotatable drum mounted on and secured to each upright shaft, each drum having fingers mounted thereon in circumferentially and longitudinally spaced apart timed relation and extending downwardly therefrom to urge the crop being harvested against the sickle of the combine, which attachment comprises;
   a. at least a pair of pans mounted on and secured to the sickle unit of the combine,
      1. each said pan having an upright wall around the transverse sides and the forward end portion,
      2. each said pan having an open rear end from which seed is directed onto the apron of the combine,
      3. the forward end of each pan, adjacent the crop row, being angulated toward the row to direct the crop being harvested inwardly,
      4. the pans of each pair defining a passageway therebetween, which passageway is in close proximity to a row of the crop being harvested, so the spaced apart, rotatable drums will direct the crop being harvested into the passageway onto the conveyor, with the shattered seed falling from the crop being directed into the pans and onto the conveyor of the combine,
      5. the forward end portion of each pan being elevated,
      6. an adjustable member connected between the forward end of each pan and the elongated frame of the harvester attachment to support said pans.

7. An attachment for a broadcast type combine having a sickle, as defined in claim 6; wherein
   a. said adjustable member connected between the forward end of each pan and said elongated frame being a screw threaded rod,
   b. an apertured lug secured to the forward end of each pan,
   c. spaced apart apertured lugs on said elongated transverse frame,
      1. a screw threaded rod rigidly connected between said apertured lugs to enable the adjustment of the forward end of each said pan.

* * * * *